United States Patent [19]
Vezirian

[11] 4,168,923
[45] Sep. 25, 1979

[54] ELECTRON BEAM WELDING OF CARBIDE INSERTS

[75] Inventor: Edward Vezirian, Fountain Valley, Calif.

[73] Assignee: Smith International, Inc., Newport Beach, Calif.

[21] Appl. No.: 844,231

[22] Filed: Oct. 21, 1977

[51] Int. Cl.$^2$ .................. B23K 9/00; F16B 11/00; B23K 31/04
[52] U.S. Cl. .................. 403/267; 403/271; 175/410; 76/108 A; 219/121 EM; 219/121 LM
[58] Field of Search ........ 76/108 R, 108 A, DIG. 11, 76/101 A, 101 R; 175/374, 375, 410, 411; 219/121 EM, 121 LM; 403/271, 267, 266, 361

[56] References Cited
U.S. PATENT DOCUMENTS

| | | | |
|---|---|---|---|
| 2,579,268 | 12/1951 | Malherbe | 76/108 R |
| 3,458,683 | 7/1969 | Canonico et al. | 219/121 EM |
| 3,513,728 | 5/1970 | Hudson et al. | 76/108 R |
| 3,576,067 | 4/1971 | Loyd | 76/108 R |
| 3,599,737 | 8/1971 | Fischer | 76/108 A |

OTHER PUBLICATIONS

Electron Beam Welding Equipment: Process Parameters, Limitations, and Controls, Henry A. James, Sciaky Bros., Inc. Chicago, Illinois, Feb. 1971.

*Primary Examiner*—Robert L. Spruill
*Assistant Examiner*—Roscoe V. Parker
*Attorney, Agent, or Firm*—Knobbe, Martens, Olson, Hubbard & Bear

[57] ABSTRACT

Carbide inserts in earth boring drilling tools are attached to the tool base metal by means of one or more spike welds formed by electron beam welding. The spike weld is formed at an angle through the metal surrounding the base of the insert and into the side of the insert near its inserted end.

15 Claims, 5 Drawing Figures

ELECTRON BEAM WELDING OF CARBIDE INSERTS

This invention relates to a method of attaching hardened inserts to a surrounding material, such method being particularly useful in attaching carbide inserts used in drill bits.

Carbide materials have long been used as inserts for drill bits and other tools used in earth boring operations. As perhaps the most common example, such inserts are employed as the cutting elements in rotary cutters, particularly the cone shaped cutters that are widely used in the oil drilling industry. Carbide inserts are also extensively used on the periphery of drill bit bodies, and on other drilling components such as stabilizers. More recently, holders made of carbide have been used to hold diamond cutting elements in drag bits, the carbide holders being inserted into mating sockets in the drill body made of a suitable steel alloy.

In each of these various applications, the usual method by which the insert is attached to the base material is to form a socket in the base material which is slightly smaller than the inserts so that an interference fit is created when the insert is pressed into the socket. The primary shortcoming of the interference approach is that the insert can later become loose and rotate or actually be dislodged from the base material. To minimize the looseness problem, an interference of several thousands is usually employed. This requires a high insertion force, often resulting in some undesirable shaving of the base metal. Even with this technique, looseness continues to be particularly a problem in high temperature drilling operations because the differing coefficients of expansion for the insert and the base material cause the heat to contribute to the loosening of the insert. One severe example of this is a geothermal operation where relatively high temperatures are encountered.

Loss of an insert results in not only the economic loss of that part but also can interfere with rotation of a cutter and cause its failure. More important is the loss of the time of personnel and other equipment which is idle when a drilling component must be prematurely replaced. In the case of carbide inserts employed as holders for diamond cutters in a drag bit, the loss of the cutter is in itself quite significant since they are expensive and many such holders may be employed on a single drill bit.

Forming an annular welding bead around the joint between the insert and the base material is not a satisfactory method for holding the insert in place because the welding temperatures are considerably higher than that encountered during a drilling operation, and such temperatures tend to cause cracks and otherwise adversely affect the strength characteristics of the carbide inserts. Further, in situations in which the base material has been heat treated, a welding operation of this type would also adversely affect such the heat treatment.

Accordingly, a need exists for an improved method for holding such inserts in position. The present invention accomplishes this by providing a method of attaching such inserts which is more reliable. Briefely, the method employs the step of creating one or more spike welds, using electron beam welding techniques, on a line that extends into and through a portion of the base material surrounding an insert and penetrates the side of the insert near the end of the insert which is inserted in the base metal. It has been found that such method when used in combination with an interference fit greatly improves the holding capability over that of an interference fit by itself. For example, employing only a single spike weld in combination with a presently used interference press-fit improves the holding strength by about fifty percent and employing a second spike weld opposite the first of the inserts, almost doubles the force required to remove the insert. Most importantly, and surprisingly, the spike welds do not significantly affect the hardness and strength characteristics of the materials. Apparently this is because the heat is highly localized.

In addition to having the fairly straight forward advantages of reducing the number of lost inserts and hence the lost drilling time, the method provides a number of other more subtle advantages. Because of the holding power provided by the spike welds, the length of the carbide inserts can be reduced. This not only reduces the cost of the expensive carbide material but more importantly reduces the depth of the insert socket required which means the base material beneath the socket is thicker, thus increasing its strength. This is very important in cone shaped rotary cutters because the shell thickness is always a tradeoff with the bearing sizes. Using only a portion of the increased thickness enables the overall shell thickness to be reduced. Thus, the shorter inserts enable larger bearing surfaces to be employed which enhances the life of the cutter.

For a more thorough understanding of the invention and its advantages, refer now to the following detailed description and drawings in which.

Figure 1:
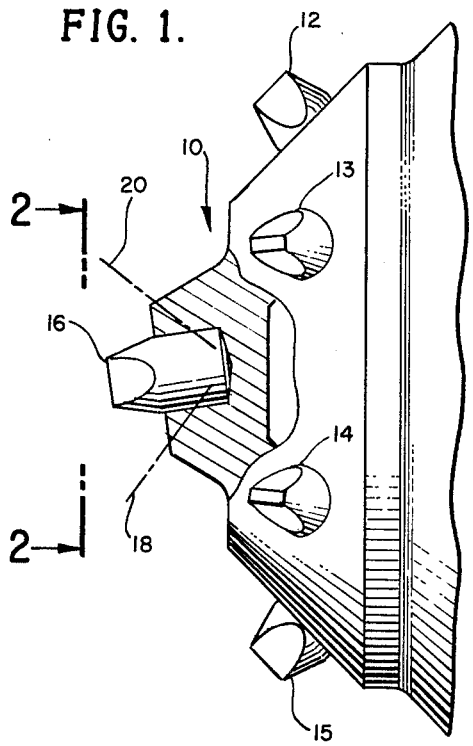
FIG. 1 is a partial view of a conical drill bit cutter with a portion of the cutter and a carbide insert shown in cross-section.
Figure 2:
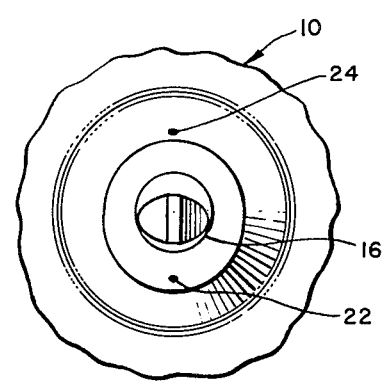
FIG. 2 is a fragmentary elevation view of a portion of the cutter of FIG. 1.
Figure 3:
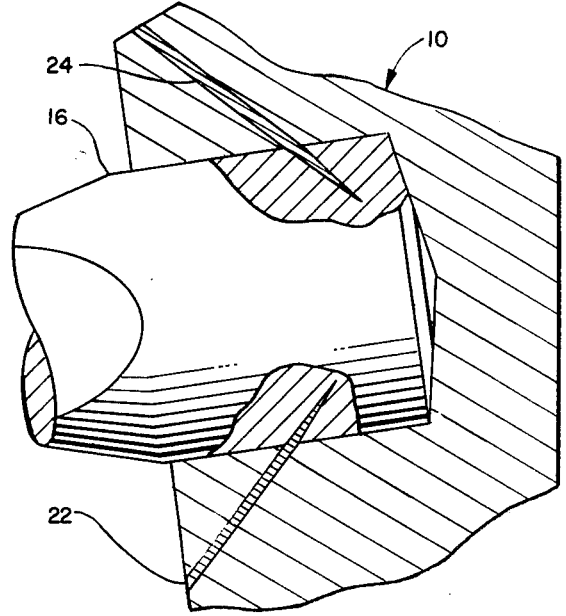
FIG. 3 is an enlarged cross-sectional view of the cutter of FIG. 1 showing the spike welds of the invention.

Referring now to FIGS. 1, 2 and 3, there is shown a typical cone shaped drill bit cutter 10 widely used in oil drilling operations. The cone cutter it rotatably mounted on suitable bearings (not shown) carried on a support leg attached to the main drill body (not shown). The cutter is formed of a conventional material used for cutters of this type, one suitable example being 9315 AISI steel.

The cutter 10 is provided with a plurality of inserts 12, 13, 14, 15 and 16, the insert 16 being shown in cross-section. Such inserts are made of extremely hard material to perform the primary cutting operations. A material frequently employed is sintered tungsten carbide, the carbide particles typically being combined with cobalt.

As explained above, such inserts have conventionally been held in position within the base metal by an interference fit. With this approach, the insert will often loosen so that it will rotate in its socket or in some cases actually be dislodged, causing cutting structure breakage and cones to bind, which may result in total bit failure.

In accordance with the present invention, it has been found that the inserts may be more securely held in the cutter by employing electron beam welding to create one or more spike welds through the cone shell into the insert. More specifically, a beam from an electron beam welder is directed along the lines 18 and 20 shown in FIG. 1. As can be seen, these lines enter the cutter cone material 10 surrounding the insert 16 at points spaced radially outwardly from the insert, and each line is directed to strike the side of the cutter near its inner end or base. The lines 18 and 20 are directed at an angle, preferably about 45 degrees, with respect to the side of the insert or the longitudinal axis of the insert. As seen from FIG. 2, the electron beam welding technique creates spike welds which appear as two points 22 and 24 on opposite sides of the insert. A standard electron beam welder may be employed, using sufficient voltage to penetrate the necessary depth.

Analyzing the welds 22 and 24 by cutting through the insert and the cone along the line of the welds 22 and 24 as shown in FIG. 3 reveals that a spike-like portion of the cutter material 10 actually penetrates the insert to mechanically lock or stake the insert in position. Such locks are useful by themselves to hold the insert since they are not greatly affected by differing expansion rates. It has been found that by using a pair of spike welds as shown in FIG. 1 in combination with a standard interference fit that the holding force is approximately double from that obtained simply by using the interference fit. This was tested by measuring the force required to punch the insert out of its socket by applying a punch to the back side of the insert. With the amount of interference reduced, the holding force is still greatly enhanced.

As mentioned above, it had previously been thought that tungsten carbide could not be welded because the heat involved would adversely affect the characteristics of the material. This is correct when a significant portion of the insert is subjected to welding temperatures, for example, if an annular weld were to be formed around the insert at the point where the insert passes through the outer face of the cone. However, the small diameter spike weld 22 is of such a short duration of concentrated energy that there is no significant adverse effect on the characteristics of the carbide. The diameter of the spike entering the carbide is typically in the range of 10 to 20 thousandths with a suitable electron beam welding operation. This represents a very small portion of the insert surface. Advantageously, the time required to make the weld is also minimal.

As mentioned above, another advantage of the electron beam, spike welding approach is that due to the increased holding power obtained, the socket for the insert does not have to be as deep as with simply the interference fit approach; and consequently, the insert length can be shortened. This in turn means that under the inserts the shell thickness of the cone cutter is increased. Because of the increased strength in that area, the overall shell thickness can be reduced which enables the bearing capacity to be increased. Cutter designers must normally balance these variables to maximize the life and reliability of the product.

Carbide inserts are employed in drilling components in many areas in addition to those on cone cutters. For example, insert buttons are employed on a cutter shirt tail and on the sides of drill bits as well as on stabilizers and other tools. In short, the method is useful in any situation wherein inserts are employed that cannot be subjected to more conventional welding techniques.

Figure 4:
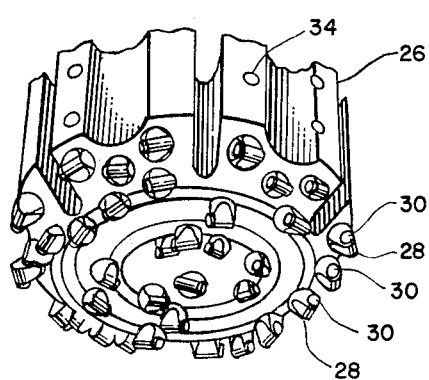
FIG. 4 is a perspective view of a drag drill bit employing diamond cutters mounted on carbide holders which are inserted in the drill body by the welding method of the invention.
Figure 5:
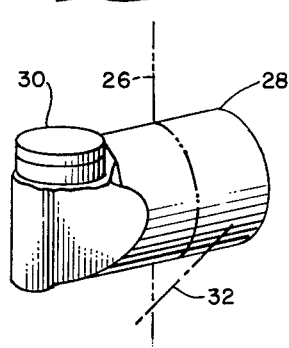
FIG. 5 is an enlarged perspective view of one of the holders of FIG. 4.

One further specific example where the method is particularly useful is in connection with so-called drag bits. Such a bit is illustrated in FIG. 4 as having a bit body 26 with carbide inserts 28 positioned in the lower end of the bit body. Each insert serves as a holder for a diamond cutting element 30 which is bonded to the carbide. In addition to being able to withstand the abrasive environment in which the drill bit is employed, carbide is advantageous because its temperature expansion characteristics are similar to that of diamond. Accordingly, it is quite useful to secure these carbide holders to the bit body by using the spike welding technique described above. That is, a spike weld is employed on a line 32, which forms an angle with the cylindrical side of the holder 28.

The tool of FIG. 4 also illustrates the use of wear buttons 34 in the form of carbide inserts positioned in the side of the tool. These inserts may also be held in place by use of the electron beam spike weld.

What is claimed is:

1. A method of attaching hard inserts to a base metal comprising:
   forming a socket in the base metal;
   installing said insert into said socket to form a tight fit; and
   applying energy to penetrate said base metal at a point spaced outwardly from said insert and on a line through said base metal and into the side of said insert adjacent the inner end to form a spike of base metal which is welded into said insert to lock the insert in the socket.

2. The method of claim 1 including the step of forming a second spike weld similar to the first weld but being located on the opposite side of the insert.

3. The method of claim 1 wherein said insert is made of carbide material.

4. The method of claim 3 wherein said insert is made of tungsten carbide.

5. The method of claim 1 wherein said insert is made of a material which should not be subjected to high welding temperatures over a large area because such treatment would adversely affect the strength characteristics of the insert.

6. The method of claim 1 wherein the line of said spike is about 45 degrees with respect to the longitudinal axis of the insert.

7. The method of claim 1 wherein the portion of the insert which is positioned in said socket has a cross-section which mates with the socket but is slightly larger than the socket so that the insert is forced into the socket and an interference fit is formed.

8. A method of attaching a carbide insert to a metal, drilling tool comprising:
   forming a socket in the tool with a diameter slightly smaller than the diameter of said insert;
   forcing one end of said insert into said socket to provide an interference fit for holding the insert in the socket; and
   forming a spike weld in said tool and insert to further hold the insert in the tool.

9. The method of claim 8 wherein said spike weld is formed on a line penetrating the tool at an exterior point spaced outwardly from the insert and extending through the tool metal and into the side of said insert adjacent its inner end.

10. The method of claim 9 wherein said tool is a drill bit having a rotatably mounted cone shaped shell and said socket is formed in said shell.

11. The method of claim 10 wherein said tool is a drag bit which includes a drill body, said socket is formed on the lower end of said body, and said insert is a holder for a diamond cutting element bonded to the insert.

12. A method of forming a drill tool comprising:
forming a drill bit from heat treated carbon steel, said bit having a socket in its surface;
inserting an insert into said socket;
applying an energy beam to penetrate said bit and said insert to form a spike of said steel extending into said insert at an angle to the boundary between the insert and the socket in a direction pointing away from said surface.

13. A method of attaching a hard insert to a carbon steel base metal comprising:
forming a socket in the base metal and heat treating said base metal;
pressing a tungsten carbide insert into said socket to provide an initial holding strength between said base metal and said insert; and
increasing said holding strength by at least twenty-five percent by energy welding a base metal spike from said base metal directly to said insert while substantially maintaining the hardness characteristics of said base metal and said inserts.

14. The combination of:
a base metal having a socket formed therein;
an insert made of a hard material which is adversly affected by high welding temperatures, applied to a significant portion of the insert, said insert having its lower end tightly positioned in said socket; and
a spike weld of said base material penetrating the side of said insert adjacent its inner end to hold the insert in the base metal.

15. The combination of claim 14 wherein said base metal is in the form of an earth boring tool and said insert is made of tungsten carbide.

* * * * *